United States Patent
Nobukawa

(10) Patent No.: US 8,835,349 B2
(45) Date of Patent: Sep. 16, 2014

(54) EXHAUST PURIFYING CATALYST

(75) Inventor: Takeshi Nobukawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/879,830

(22) PCT Filed: Oct. 20, 2011

(86) PCT No.: PCT/IB2011/002505
§ 371 (c)(1),
(2), (4) Date: Apr. 17, 2013

(87) PCT Pub. No.: WO2012/052828
PCT Pub. Date: Apr. 26, 2012

(65) Prior Publication Data
US 2013/0203588 A1    Aug. 8, 2013

(30) Foreign Application Priority Data
Oct. 22, 2010    (JP) ................... 2010-237550

(51) Int. Cl.
*B01J 23/42* (2006.01)
*F01N 3/08* (2006.01)
*B01J 23/63* (2006.01)
*B01D 53/94* (2006.01)

(52) U.S. Cl.
CPC ..... *B01D 53/9427* (2013.01); *F01N 2510/0682* (2013.01); *F01N 3/0864* (2013.01); *Y02T 10/20* (2013.01); *B01J 23/63* (2013.01); *F01N 3/0807* (2013.01)
USPC ........... 502/339; 502/304; 502/325; 502/332; 423/213.2; 423/239.1

(58) Field of Classification Search
USPC .................. 502/339, 304, 303, 325, 332; 423/213.2, 239.1
See application file for complete search history.

(56) References Cited

U.S. PATENT DOCUMENTS

2003/0061860 A1    4/2003    Hu et al.
(Continued)

FOREIGN PATENT DOCUMENTS

| CN | 101568381 | 10/2009 |
|---|---|---|
| EP | 1 911 517 A1 | 4/2008 |
| JP | 2007-21456 | 2/2007 |
| JP | 2008-62130 | 3/2008 |

(Continued)

OTHER PUBLICATIONS

Applicant's Response to the Written Opinion of the International Searching Authority in International Application No. PCT/IB2011/002505 (Jun. 25, 2012).

*Primary Examiner* — Colleen Dunn
*Assistant Examiner* — Haytham Soliman
(74) *Attorney, Agent, or Firm* — Finnegan, Henderson, Farabow, Garrett & Dunner, LLP

(57) ABSTRACT

An exhaust purifying catalyst includes: a substrate; a first-stage catalyst that includes an oxygen storage capacity (OSC) material and that is provided on the substrate on an upstream side thereof in an exhaust gas flow direction; and a second-stage catalyst that includes an OSC material and that is provided on the substrate on a downstream side thereof in an exhaust gas flow direction. The OSC material included in the first-stage catalyst and the second-stage catalyst includes OSC material on which a noble metal is not supported. The proportion of the amount of the OSC material, on which a noble metal is not supported, and that is included in the second-stage catalyst with respect to the combined amount of the OSC material, on which a noble metal is not supported, and that is included in the first-stage catalyst and the second-stage catalyst is in a range of from 0 to 50 wt %.

13 Claims, 2 Drawing Sheets

(56) References Cited

U.S. PATENT DOCUMENTS

| | | |
|---|---|---|
| 2009/0124492 A1 | 5/2009 | Kitamura et al. |
| 2010/0061903 A1 | 3/2010 | Kohara et al. |
| 2010/0104491 A1 | 4/2010 | Deeba et al. |
| 2012/0021899 A1 | 1/2012 | Nobukawa et al. |
| 2013/0029840 A1 | 1/2013 | Morikawa et al. |

FOREIGN PATENT DOCUMENTS

| | | |
|---|---|---|
| JP | 2009-19537 | 1/2009 |
| JP | 2011-167631 | 9/2011 |
| JP | 2011-219329 | 11/2011 |
| JP | 2012-24701 | 2/2012 |
| JP | 2012-152702 | 8/2012 |
| WO | WO 2008/093471 A1 | 8/2008 |
| WO | WO 2012/101505 A1 | 8/2012 |

EXHAUST PURIFYING CATALYST

CROSS-REFERENCE TO RELATED APPLICATIONS

This application is a national phase application of International Application No. PCT/IB2011/002505, filed Oct. 20, 2011, and claims the priority of Japanese Application No. 2010-237550, filed Oct. 22, 2010, the content of both of which is incorporated herein by reference.

BACKGROUND OF THE INVENTION

1. Field of the Invention

The invention relates to an exhaust purifying catalyst, and more particularly to an exhaust purifying catalyst which, by using a specific combination of oxygen storage/release capacity materials (also abbreviated below as "OSC materials") in the catalyst, is able to provide a high $NO_x$ purifying capacity even following endurance under fluctuating air-to-fuel (A/F) ratio conditions. In this specification, "high NO purifying capacity" refers to a $NO_x$ purifying capacity which is comparable to or higher than that of conventional exhaust purifying catalysts.

2. Description of the Related Art

The exhaust gases discharged from automotive and other internal combustion engines contain HC, CO and $NO_x$. These substances are cleansed with an exhaust purifying catalyst, then released into the atmosphere. Three-way catalysts composed of a noble metal such as platinum (Pt), palladium (Pd) or rhodium (Rh) supported on a porous oxide support such as alumina $Al_2O_3$), (silica ($SiO_2$), zirconia ($ZrO_2$) or titania ($TiO_2$) are widely used as typical exhaust purifying catalysts.

Such a three-way catalyst purifies by oxidizing the HC and CO in exhaust gases and reducing $NO_x$ and is most highly effective for cleansing exhaust gases from a stoichiometric atmospheric that has been combusted near a stoichiometric air-fuel ratio. Recently, in particular, given the desire to increase gas mileage, modifications such as raising the fuel cut (FC) number at high temperature have increased the opportunities for exposure of the exhaust purifying catalyst to rapid atmospheric fluctuations based on fluctuations in the A/F ratio at high temperature. Such rapid atmospheric fluctuations greatly accelerate catalyst deterioration.

In an exhaust purifying catalyst, the A/F ratio of gas entering the catalyst constantly undergoes large changes due to driving conditions such as acceleration and deceleration. In general, the catalyst interior is controlled so as to be stoichiometric by an oxygen sensor placed downstream from the exhaust purifying catalyst. Hence, there is a desire for the catalyst to have a rapid oxygen storage/release rate which can absorb excessive changes in the A/F ratio. At the same time, there also exist in the drive mode drive regions where changes in the vehicle velocity are sluggish, and so there also is a desire for the ability to manifest a long-term oxygen storage capacity in circumstances where changes in the A/F ratio of gas entering the catalyst are slow.

In addition, because the noble metals used in exhaust purifying catalysts are expensive and pose certain challenges in terms of resources, there is a need to increase the catalyst performance and reduce the amount in which such metals are used. At the same time, there is a desire to conform to emissions standards which are becoming increasingly stringent. Because of such concerns, various investigations are being conducted with the aim of increasing the activity of exhaust purifying catalysts.

For example, Japanese Patent Application Publication No. 2008-62130 (JP-A-2008-62130) describes an exhaust purifying catalyst which contains oxygen storage material particles. The catalyst is obtained by mixing first cerium-based oxygen storage material particles (A) having a first number-mean particle diameter and second cerium-based oxygen storage material particles (B) of the same composition as the above particles (A) and having a second number-mean particle diameter that is larger than the first number-mean particle diameter so as to adjust the resulting oxygen storage capacity deterioration time to a predetermined time. However, this publication mentions nothing about the catalytic performance of the catalyst.

International Publication No. 2008-93471 discloses a catalyst system for use in an automotive exhaust purifying device, the catalyst system using two or more exhaust purifying catalysts which include a first catalyst supported on a support having an inorganic structure and a second catalyst which differs from the first catalyst. The first catalyst is supported at an inorganic structure supporting portion positioned on the upstream side in an exhaust flow channel, and the second catalyst is supported at an inorganic structure supporting portion positioned on the downstream side in the exhaust flow channel and includes in the crystal structure a pyrochlore phase-containing cerium-zirconium-based complex oxide (A). The results given in the specific examples are an air excess ratio λ [(actual air/fuel ratio)/(stoichiometric air/fuel ratio)] of 1.02 or more and a decrease in the $NO_x$ purification ratio to below 60%.

In addition, Japanese Patent Application Publication No. 2009-19537 (JP-A-2009-19537) discloses an exhaust purifying catalyst having Pd/alumina composed of palladium supported on alumina particles and Rh/OSC material composed of rhodium supported on oxygen storage material particles disposed at an upstream side catalyst portion, and having Pt-alumina composed of platinum supported on alumina particles and Rh/OSC material composed of rhodium supported on oxygen storage material particles disposed at a downstream side catalyst portion. The oxygen storage material particles at the upstream side catalyst portion are composed of a complex oxide having a weight ratio $ZrO_2/CeO_2$ of 1 or more. However, no mention whatsoever is made of catalyst containing free OSC material in which an OSC material does not support a noble metal.

Because the exhaust purifying catalysts described in these patent publications do not have a sufficient $NO_x$ purifying capacity following endurance under fluctuating A/F ratio conditions, there exists a desire for an exhaust purifying catalyst having a higher $NO_x$ purifying capacity.

SUMMARY OF THE INVENTION

The invention provides an exhaust purifying catalyst which is capable of providing a high $NO_x$ purifying capacity even following endurance under fluctuating A/F ratio conditions.

The inventors have discovered that, in exhaust purifying catalysts which control the rate of oxygen storage/release reactions by means of the Ce/Zr molar ratio and the specific surface area and by increasing the amount of noble metal supported in OSC (e.g., ceria-zirconia solid solution) materials in the related art, for example, if the Ce/Zr molar ratio is lowered in order to increase the rate of oxygen storage/release reactions, the oxygen storage capacity decreases and long-term OSC cannot be achieved; if the specific surface area is decreased, the noble metal that has been supported tends to undergo particle growth, lowering the purifying capacity; and if the rate of oxygen storage/release reactions is controlled by the above parameter control and the amount of noble metal is decreased, a high $NO_x$ purifying capacity following endurance under fluctuating A/F ratio conditions is difficult to achieve. These findings ultimately led to the invention.

Accordingly, an aspect of the invention relates to an exhaust purifying catalyst. This exhaust purifying catalyst has: a substrate; a first-stage catalyst that includes an oxygen storage capacity material and that is provided on the substrate at an upstream side of the substrate in an exhaust gas flow direction; and a second-stage catalyst that includes an oxygen storage capacity material and that is provided on the substrate at a downstream side of the substrate in an exhaust gas flow direction. The oxygen storage capacity material included in the first-stage catalyst and the second-stage catalyst includes oxygen storage capacity material, on which a noble metal is not supported, a proportion of an amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst being in a range of from 0 to 50 wt %.

In the above exhaust purifying catalyst, the first-stage catalyst and the second-stage catalyst may be arranged contiguously.

In the above exhaust purifying catalyst, the first-stage catalyst and the second-stage catalyst may each be composed of one or more coat, at least one of the first-stage catalyst and the second-stage catalyst may include the oxygen storage capacity material on which a noble metal is supported; and at least a portion of the oxygen storage capacity material, on which a noble metal is not supported, may be present in the same coat as the oxygen storage capacity material on which a noble metal is supported.

In the above exhaust purifying catalyst, the oxygen storage capacity material, on which a noble metal is not supported, may have a pyrochlore phase-type ordered array structure.

In the above exhaust purifying catalyst, a proportion of the amount of the oxygen storage capacity material, on which a noble metal is not supported, with respect to the combined amount of the oxygen storage capacity material that is included in the first-stage catalyst and the second-stage catalyst may be in a range of from 3 to 36 wt %.

In the above exhaust purifying catalyst, the proportion of the amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst may be in a range of from 0 to 35 wt %, and a proportion of the amount of the oxygen storage capacity material, on which a noble metal is not supported, with respect to the combined amount of the oxygen storage capacity material included in the first-stage catalyst and the second-stage catalyst may be in a range of from 3 to 30 wt %.

In the above exhaust purifying catalyst, the proportion of the amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst may be in a range of from 0 to 34 wt %, and the proportion of the amount of the oxygen storage capacity material, on which a noble metal is not supported, with respect to the combined amount of the oxygen storage capacity material included in the first-stage catalyst and the second-stage catalyst may be in a range of from 3 to 25 wt %.

In the above exhaust purifying catalyst, the proportion of the amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst may be in a range of from 0 to 35 wt %, and a proportion of the amount of the oxygen storage capacity material, on which a noble metal is not supported, with respect to the combined amount of the oxygen storage capacity material included in the first-stage catalyst and the second-stage catalyst may be in a range of from 5 to 30 wt %.

In the above exhaust purifying catalyst, the proportion of the amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst may be in a range of from 0 to 34 wt %, and the proportion of the amount of the oxygen storage capacity material, on which a noble metal is not supported, with respect to the combined amount of the oxygen storage capacity material included in the first-stage catalyst and the second-stage catalyst may be in a range of from 8 to 25 wt %.

In the above exhaust purifying catalyst, the proportion of the amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst may be in a range of from 0 to 25 wt %, and a proportion of the amount of the oxygen storage capacity material, on which a noble metal is not supported, with respect to the combined amount of the oxygen storage capacity material included in the first-stage catalyst and the second-stage catalyst may be in a range of from 8 to 16 wt %.

In the above exhaust purifying catalyst, the first-stage catalyst and the second-stage catalyst may respectively contain a top coat that includes rhodium as a top-coat noble metal, and a bottom coat that includes platinum or palladium, or platinum and palladium a bottom-coat noble metal.

In the above exhaust purifying catalyst, all the oxygen storage capacity material, on which a noble metal is not supported, may be included in the bottom coat.

In the above exhaust purifying catalyst, the first-stage catalyst and the second-stage catalyst may include the oxygen storage capacity material of at least two types having different oxygen storage/release rates.

In the above exhaust purifying catalyst, the first-stage catalyst and the second-stage catalyst may include the oxygen storage capacity material of at least two types having different oxygen storage/release rates such that the oxygen storage/release rate by the first-stage catalyst is lower than the oxygen storage/release rate by the second-stage catalyst.

In the above exhaust purifying catalyst, the bottom coat may further include alumina.

In the above exhaust purifying catalyst, the first-stage catalyst and the second-stage catalyst respectively may contain a top coat that includes rhodium as the coat of upper noble metal, and a bottom coat that includes platinum or palladium, or platinum and palladium as the coat of lower noble metal.

This invention enables an exhaust purifying catalyst which can impart a high $NO_x$ purifying capacity even following endurance under A/F fluctuation conditions to be obtained.

BRIEF DESCRIPTION OF THE DRAWINGS

The features, advantages, and technical and industrial significance of exemplary embodiments of the invention are described below with reference to the accompanying drawings, in which like numerals denote like elements, and wherein.

DETAILED DESCRIPTION OF EMBODIMENTS

Figure 1:
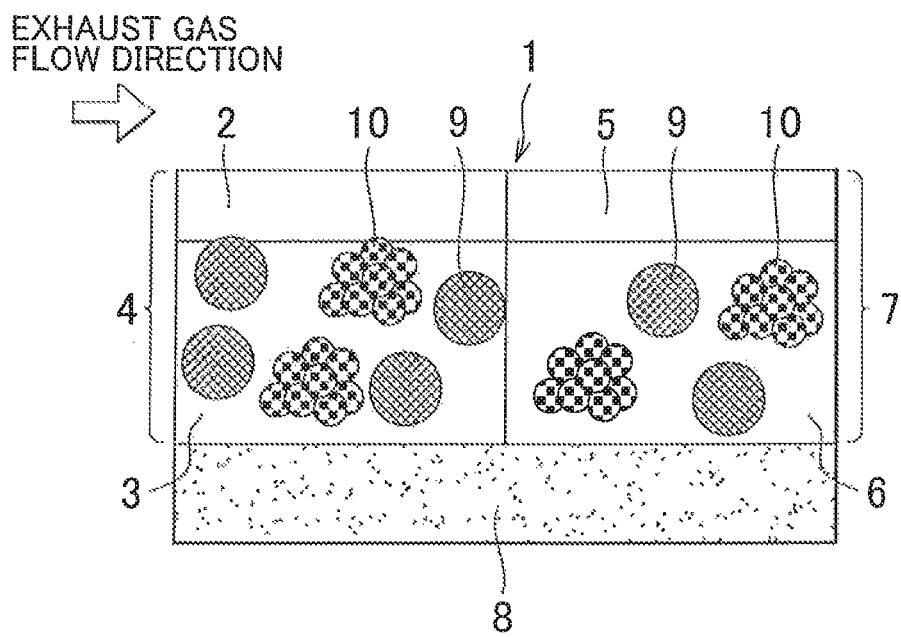
FIG. 1 is a partially enlarged cross-sectional schematic view of an exhaust purifying catalyst according to one embodiment of the invention.

According to an aspect of the invention, an exhaust purifying catalyst wherein a first-stage catalyst is provided on a substrate at an upstream side of the substrate in the exhaust flowing direction and a second-stage catalyst is provided on the substrate at a downstream side of the substrate, OSC material is included in both the first-stage catalyst and the second-stage catalyst, and the proportion of the amount of OSC material on which a noble metal is not supported (which OSC material is sometimes abbreviated below as "OSC material (N)") that is included in the second-stage catalyst with respect to the combined amount of OSC material (N) that is included in the first-stage catalyst and the second-stage catalyst is in a range of from 0 to 50 wt % is capable of achieving a higher $NO_x$ purification ratio following an endurance test under fluctuating A/F ratio conditions, as determined by the measurement method described in detail in the subsequent "Examples" section, than exhaust purifying catalysts in the related art.

Automotive exhaust purifying catalysts according to the aspect of the invention include the following in particular:
(1) such exhaust purifying catalysts in which the first-stage catalyst and the second-stage catalyst are arranged contiguously;
(2) such exhaust purifying catalysts in which at least some portion of the OSC material (N) is present in the same coat as OSC material on which a noble metal has been directly supported (sometimes abbreviated below as "OSC material (S)");
(3) such exhaust purifying catalysts in which the OSC material (N) has a pyrochlore phase-type ordered array structure;
(4) such exhaust purifying catalysts in which the ratio of the OSC material (N) to the combined amount of the OSC material that is included in the first-stage catalyst and the second-stage catalyst is in a range of from 3 to 36 wt %;
(5) such exhaust purifying catalysts in which the proportion of the amount of the OSC material (N) that is included in the second-stage catalyst with respect to the combined amount of the OSC material (N) that is included in the first-stage catalyst and the second-stage catalyst is in a range of from 0 to 35 wt %, and the proportion of the amount of the OSC material (N) with respect to the combined amount of the OSC material that is included in the first-stage catalyst and the second-stage catalyst is in a range of from 5 to 30 wt %;
(6) such exhaust purifying catalysts in which the first-stage catalyst and the second-stage catalyst respectively contain an Rh coat (top coat) that includes rhodium as a top-coat noble metal, and a Pt and/or Pd coat (bottom coat) that includes platinum and/or palladium as a bottom-coat noble metal;
(7) such exhaust purifying catalysts in which all the OSC material (N) is included in the Pt and/or Pd coat;
(8) such exhaust purifying catalysts in which the first-stage catalyst and the second-stage catalyst include the OSC material in at least two types having different oxygen storage/release rates; and
(9) such exhaust purifying catalysts in which the Pt and/or Pd coat additionally includes alumina ($Al_2O_3$).

The embodiments of the invention are described below in conjunction with FIGS. 1 to 3. Referring to FIG. 1, in an exhaust purifying catalyst 1 according to the embodiments of the invention, a first-stage catalyst 4 composed of an Rh coat 2 as the top coat and a Pt and/or Pd coat 3 as the bottom coat which is located at an upstream side position in the exhaust flow direction, and a second-stage catalyst 7 composed of an Rh coat 5 as the top coat and a Pt and/or Pd coat 6 as the bottom coat which is located at a downstream side position in the exhaust flow direction are each provided on a substrate 8. OSC materials composed of an OSC material 9 on which a noble metal is not supported and an OSC material 10 on which a noble metal is supported are included in both the first-stage catalyst 4 and the second-stage catalyst 7, and the first-stage catalyst 4 and the second-stage catalyst 7 are arranged so as to be contiguous.

Figure 2:
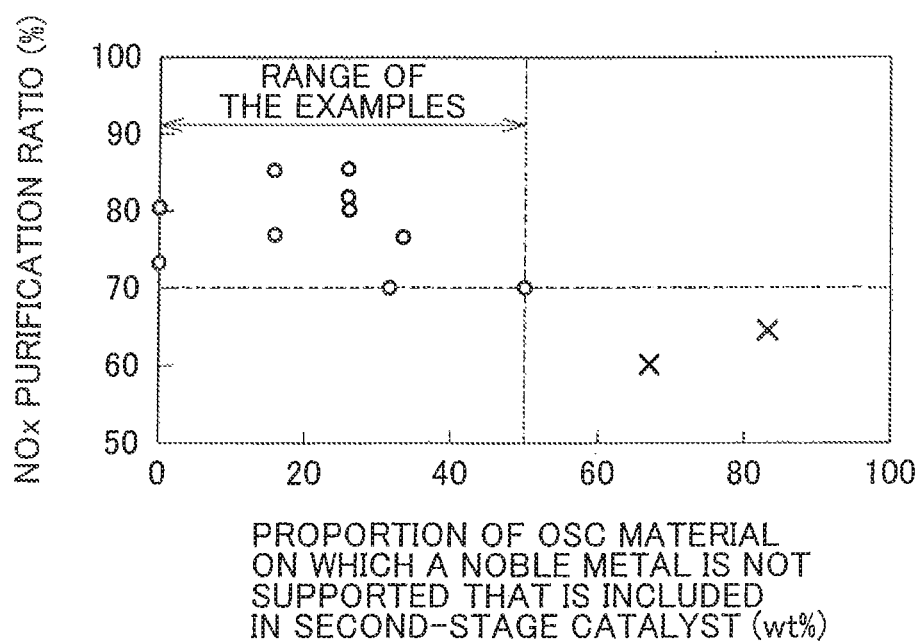
FIG. 2 is a graph showing the relationship between the $NO_x$ purification ratio following an endurance test under fluctuating A/F ratio conditions using exhaust purifying catalysts obtained in examples of the invention and comparative examples, and the proportion of the amount of OSC material (N) included in the second-stage catalyst with respect to the combined amount of OSC material (N) included in the first-stage catalyst and the second-stage catalyst.
Figure 3:
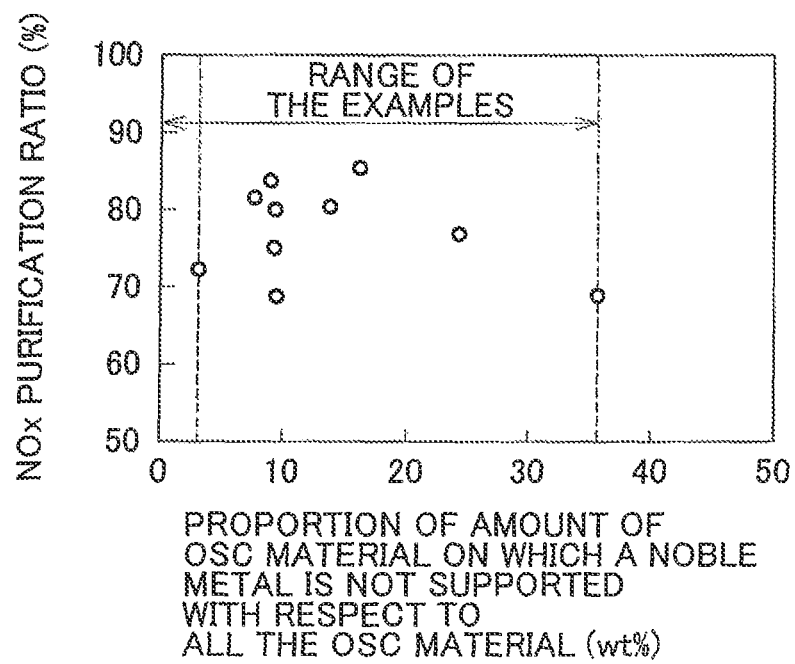
FIG. 3 is a graph showing the relationship between the $NO_x$ purification ratio following an endurance test under fluctuating A/F ratio conditions using the exhaust purifying catalyst obtained in examples of the invention, and the proportion of the amount of OSC material (N) with respect to the combined amount of OSC material included in the first-stage catalyst and the second-stage catalyst.

It will be appreciated that the exhaust purifying catalyst according to the embodiments of the invention, by having a proportion of an amount of OSC material (N) included in the second-stage catalyst with respect to the combined amount of OSC material (N) included in the first-stage catalyst and the second-stage catalyst in a range of from 0 to 50 wt %, exhibits, as shown in FIG. 2, a higher $NO_x$ purification ratio following an endurance test under fluctuating A/F ratio conditions, as determined by the measurement method described in the subsequent "Examples" section, which is higher than exhaust purifying catalysts for which this amount of OSC material (N) falls outside of the above range. It will moreover be appreciated that, preferably, an exhaust purifying catalyst in which the proportion of the amount of the OSC material (N) with respect to the combined amount of OSC material included in the first-stage catalyst and the second-stage catalyst is in a range of from 3 to 36 wt %, and especially an exhaust purifying catalyst in which the proportion of the amount of OSC material (N) included in the second-stage catalyst with respect to the combined amount of OSC material (N) included in the first-stage catalyst and the second-stage catalyst is in a range of from 0 to 35 wt % and the proportion of the amount of OSC material (N) with respect to the combined amount of OSC material included in the first-stage catalyst and the second-stage catalyst is in a range of from 5 to 30 wt %, has an even higher NO purification ratio, as shown in FIGS. 2 and 3.

Although the reason why a high $NO_x$ purification ratio is achieved by exhaust purifying catalysts within the ranges specified in the invention has not been theoretically elucidated, it is believed that because rich gas (e.g., CO, $H_2$) or lean gas ($O_2$) concentrations in the exhaust that enters the catalyst are high, in the first-stage catalyst containing a high proportion of OSC material (N), oxygen storing and releasing reactions are promoted, enabling a high purifying capacity to be achieved, and due to the inflow of relatively high-temperature exhaust into the catalyst, the OSC effects of OSC materials (N) having a slow oxygen storage/release rate are manifested for an even longer time.

The exhaust purifying catalyst of the embodiment of the invention can be obtained by providing a first-stage catalyst at an upstream side position the exhaust flow direction and a second-stage catalyst at the downstream side, with each of the catalysts containing OSC material and, at that time, setting the proportion of the amount of OSC material (N) included in the second-stage catalyst with respect to the combined amount of OSC material (N) within a range of from 0 to 50 wt %. It is preferable to provide, as a bottom layer of the first-stage catalyst and of the second-stage catalyst, a PT and/or Pd coat which contains Pt and/or Pd as the noble metal, and to provide, as a top layer of the first-stage catalyst and the second-stage catalyst, an Rh coat which contains rhodium as the noble metal. Moreover, the relative proportions of the first-stage catalyst to the second-stage catalyst (first-stage catalyst:second-stage catalyst), expressed as the ratio of the surface area of the substrate over which the two catalysts have been placed, may be within a range of from 1:9 to 9:1, and especially from 4:6 to 6:4. In the embodiments of the invention, the first-stage catalyst and the second-stage catalyst in the exhaust purifying catalyst may be provided on the substrate in such a way as to be mutually separated, although they are preferably provided as to be mutually contiguous.

The substrate is exemplified by ceramic materials such as cordierite, and metal substrates such as stainless steel. The substrate may have a straight-flow type shape, a filter type shape, or some other shape. The effects of the invention may be achieved without limitations as to the shape of the substrate.

The OSC material in the embodiments of the invention may be, for example, an OSC material having a pyrochlore phase-type ordered array structure, or an OSC material having a higher oxygen storage/release rate and a lower oxygen storage capacity than OSC materials having a pyrochlore phase-type ordered array structure. OSC materials having such a pyrochlore phase-type ordered array structure may be observed to have, in an X-ray diffraction pattern following endurance at 1,000° C. under the conditions described subsequently in the "Examples" section, the three pyrochlore phase diffraction peaks at $2\theta$=approximately 14°, approximately 28° and approximately 37°. By contrast, in OSC materials which do not have a pyrochlore phase-type ordered array structure, the three above pyrochlore phase diffraction peaks have disappeared from an X-ray diffraction pattern similarly measured after endurance at 1,000° C.

The latter OSC materials are exemplified by any cerium-containing oxide which does not have the above pyrochlore phase-type ordered array structure. Such cerium-containing oxides include ceria ($CeO_2$). $CeO_2$ may be preferably used as a ceria complex oxide, such as a ceria-zirconia ($CeO_2$—$ZrO_2$) complex oxide (CZ). Examples of such ceria complex oxides include secondary particles of a solid solution composed of the three elements cerium, zirconium and oxygen, and secondary particles of a solid solution composed of four or more elements which include, in addition to the three above elements, a rare-earth element such as yttrium or neodymium.

OSC materials having such a pyrochlore phase-type ordered array structure are exemplified by, for example, ceria-zirconia complex oxides which can be obtained by pressing, at a temperature of at least 1,500° C. and up to 1,900° C., especially a temperature of at least 1,700° C. and up to 1,800° C., and at a pressure of at least 100 MPa, a complex oxide powder having a molar ratio of ceria to zirconia ($CeO_2$:$ZrO_2$) in a range of from 55:45 to 49:51 wherein the cerium ions and zirconium ions are uniformly mixed at an atomic level, and then by reducing treatment. Furthermore, OSC materials having such a pyrochlore phase-type ordered array structure are exemplified by, for example, ceria-zirconia complex oxides which can be obtained by pressing, at a temperature of at least 1,450° C. and up to 2,000° C., especially a temperature of at least 1,700° C. and up to 1,800° C., and at a pressure of at 392 to 343.2 MPa, a complex oxide powder having molar ratio of ceria to zirconia ($CeO_2$:$ZrO_2$) in a range of from 55:45 to 43:57 wherein the cerium ions and zirconium ions are uniformly mixed at an atomic level, and then by reducing treatment.

In the embodiments of the invention, it is preferable for the proportion of the amount of OSC material (N) included in the second-stage catalyst with respect to the combined amount of OSC material (N) included in the first-stage catalyst and the second-stage catalyst to be in a range of from 0 to 50 wt %, and particularly for the proportion of the amount of OSC material (N) included in the second-stage catalyst with respect to the combined amount of OSC material (N) included in the first-stage catalyst and the second-stage catalyst to be in a range of from 0 to 35 wt %, and for the proportion of the amount of OSC material (N) with respect to the combined amount of OSC material included in the first-stage catalyst and the second-stage catalyst to be in a range of from 5 to 30 wt %, Outside of these ranges, the $NO_x$ purifying effect decreases. Also, in the exhaust purifying catalyst of the embodiments of the invention, it is preferable to use as the OSC material (N) an OSC material having a pyrochlore phase-type ordered array structure.

The noble metal included in the first-stage catalyst and the second-stage catalyst in the embodiments of the invention may be supported on an OSC material under the same conditions as are employed in conventional exhaust purifying catalysts. The amount of noble metal supported in each is preferably from 0.1 to 1.5 g/L. The first-stage catalyst and the second-stage catalyst in the invention may include at least one type of supporting substrate selected from among, for example $Al_2O_3$, $SiO_2$, $TiO_2$ and $ZrO_2$. Of these, $ZrO_2$ is preferred. The first-stage catalyst and second-stage catalyst may also include, as a binder, an alumina binder.

The exhaust purifying catalyst of the embodiments of the invention may be obtained by a production method which includes, for example, the steps of: furnishing a honeycomb substrate; preparing a bottom coat-forming slurry for the first-layer catalyst and a bottom coat-forming slurry for the second-stage catalyst by mixing together an OSC material (N), are OSC material (S) which supports a noble metal such as platinum and/or palladium, and, in some cases, a supporting substrate (e.g., $Al_2O_3$), then mixing therein a binder such as an alumina binder in any ratio, and adding water; pouring the bottom coat-forming slurry for the first-stage catalyst from an opening on what will presumably be the upstream side in the exhaust flow direction of the substrate, such as a honeycomb substrate, up to any position in the lengthwise direction of the substrate, such as one-half the total length, drying and firing; pouring the bottom coat-forming slurry for the second-stage catalyst from an opening on what will presumably be the downstream side in the exhaust flow direction up to the remaining portion of the substrate in the lengthwise direction, such as one-half the total length, drying and firing; then pouring onto the bottom coat a top coat-forming slurry prepared by mixing an OSC material (S) on which rhodium is supported and a binder, such as an alumina binder, and adding water, and subsequently drying and firing the slurry. This production method involves first pouring the bottom coat-forming slurry for the first-stage catalyst onto the substrate, then pouring the bottom coat-forming slurry for the second-stage catalyst, although the order in which the two slurries are poured may be reversed.

In the above production method, the bottom coat-forming slurry for the first-stage catalyst, the bottom coat-forming slurry for the second-stage catalyst and the top coat-forming slurry typically have a proportion of an amount of OSC material (N) included in the second-stage catalyst with respect to the combined amount of OSC material (N) included in the first-stage catalyst and the second-stage catalyst set in a range of from 0 to 50 wt %, and preferably have a proportion of an amount of OSC material (N) included in the second-stage catalyst with respect to the combined amount of OSC material (N) included in the first-stage catalyst and the second-stage catalyst set in a range of from 0 to 35 wt % and a proportion of an amount of OSC material (N) with respect to the combined amount of OSC material included in the first-stage catalyst and the second-stage catalyst in a range of from 5 to 30 wt %.

By being constituted as described above, the exhaust purifying catalyst of the embodiments of the invention is capable of having a high $NO_x$ purifying capacity. The exhaust purifying catalyst of the embodiments of the invention may be used in combination with a component having another function, such as a particulate filter.

EXAMPLES

Examples of the invention are described below together with comparative examples. The following examples of the invention are given solely by way of explanation, and are not intended to limit the invention. In each of the following examples, the $NO_x$ purification ratio of the exhaust purifying catalyst was determined by a catalyst evaluation method after carrying out the subsequently described endurance test. The exhaust purifying catalyst endurance test and catalyst evaluation method are not limited to the methods described in this specification, and may of course be similarly carried out by methods regarded to be substantially equivalent by persons skilled in the art.

The CZ materials used in each of the following examples, and the alumina compositions and/or properties are shown below. CZ material (A) and CZ material (B) in the table are commercial products. Also, the specific surface area was measured by the BET method, and the mean particle diameter was measured by the dynamic light scattering method (particle size distribution measurement).

The supplier of CZ material (A) (powder) was Rhodia.

The supplier of CZ material (B) (powder) was Rhodia.

The supplier of alumina (powder) was Sasol Ltd. (mean particle diameter, 45 μm; specific surface area, 100 $m^2/g$).

TABLE 1

| CZ material | Composition | | | | | | Specific surface area ($m^2/g$) |
| --- | --- | --- | --- | --- | --- | --- | --- |
| | $CeO_2$ | $ZrO_2$ | $La_2O_3$ | $Y_2O_3$ | $Nd_2O_3$ | $Al_2O_3$ | |
| (A) | 30 | 60 | 5 | 5 | | | 63 |
| (B) | 20 | 26 | 2 | | 2 | 52 | 150 |
| (C) | 58 | 42 | | | | | 0.6 |

Reference Example 1

Preparation of CZ Material (C) Having a Pyrochlore Phase-Type Ordered Structure

First, 49.1 g of a 28 wt % ($CeO_2$ equivalent) aqueous solution of cerium nitrate, 54.7 g of an 18 wt % ($ZrO_2$ equivalent) aqueous solution of zirconium oxynitrate and a commercial surfactant were dissolved in 90 mL of ion-exchanged water, following which 1.2 equivalents of ammonia water containing 25 wt % of $NH_3$ was added per equivalent of anions, giving rise to co-precipitation. The resulting co-precipitate was filtered and washed. The co-precipitate was then dried at 110° C., and subsequently fired in the open air at 500° C. for 5 hours, thereby giving a solid solution of cerium and zirconium. Next, the solid solution was ground using a mill to a mean particle diameter of 1,000 nm, thereby giving a ceria-zirconia solid solution powder containing ceria and zirconia in a molar ratio therebetween ($CeO_2$:$ZrO_2$) of 50:50. This ceria-zirconia solid solution powder was filled into a polyethylene bag and the interior was deaerated, following which the mouth of the bag was heated and sealed. Next, pressing was carried out for 1 minute at a pressure of 300 MPa using an isostatic press, thereby giving a solid precursor composed of the ceria-zirconia solid solution powder. Next, the resulting solid precursor was placed in a graphite crucible and covered with a graphite cover, then reduced in argon gas at 1,700° C. for 5 hours. The reduced sample was ground in a mill to give a powder having a mean particle diameter of about 5 μm, thereby giving the CZ material (C) (powder).

Example 1

A Pd-supporting CZ material (A) was prepared by impregnating and supporting a palladium nitrate solution on the CZ material (A), then drying and firing. A Rh-supporting CZ material (B) was prepared by impregnating and supporting a rhodium nitrate solution on the CZ material (B), then drying and firing. Next, a bottom coat-forming slurry (1) for the first-stage catalyst was prepared by blending a mixture of the Pd-supporting CZ material (A), CZ material (C) and alumina in the weight ratio shown in Table 2 below (100:20:35) with alumina binder in a weight ratio of 20:1 and adding water, and a bottom coat-forming slurry (1) for the second-stage catalyst was prepared by blending a mixture of the Pd-supporting CZ material (A), CZ material (C) and alumina in the weight ratio shown in Table 2 below (100:10:45) with alumina binder in a weight ratio of 20:1 and adding water. A top coat-forming slurry (2) was prepared by blending the Rh-supporting CZ material (B) with alumina binder in a weight ratio of 20:1 and adding water. In Table 2, the proportions of the CZ material (A) (bottom coat), CZ material (B) (top coat), CZ material (C) (bottom coat) and alumina (bottom coat) are indicated as weight ratios.

The bottom coat-forming slurry (1) for the first-stage catalyst was poured from a top opening on what was presumed to be the upstream side in the exhaust flow direction of a honeycomb substrate (600 cell, wall thickness, 3 mils; 103 mm (dia.)×105 mm (L)) and the bottom was coated by suction, following which similarly to the coating above, coating is performed up to the center portion of the catalyst and the slurry was dried and fired. At this time, the amount of slurry poured in and the solids content and suction conditions were adjusted in such a way that the first-stage catalyst coats up to the center portion of the catalyst. Next, the bottom coat-forming slurry (1) for the second-stage catalyst was poured in from the end opposite to the first coat to coat up to the center portion of the catalyst in the same way as the first coat, following which the slurry was dried and fired. Next, the top coat-forming slurry (2) was poured over the first coat so as to coat the entire catalyst, following which the slurry was dried and fired. The coated amount was adjusted so that the weight after firing became 200 g/L. The amounts of the supported noble metals were set to Pd/Rh=1.0/0.2 (g/L).

Endurance Test

To confirm whether the resulting exhaust purifying catalyst retains a catalytic activity even after a given amount of driving, an accelerated deterioration test (endurance test) was carried out using an actual engine. A ceramic mat was wrapped around a honeycomb substrate having the first-stage catalyst and the second-stage catalyst thereon, and this assembly was tightly placed in an exhaust line, and a thermocouple was inserted into the center of the honeycomb. This exhaust line was installed in an engine, and the engine rpm/torque ratio was adjusted so that the thermocouple temperature became 1,000° C.±20° C. At this time, a cycle test was conducted in which A/F ratios of 14 and 15 were repeated for fixed intervals of time each. The length of the endurance test was 50 hours. Even after the foregoing endurance, in an X-ray diffraction pattern obtained by X-ray diffraction measurement, the above CZ material (C) was observed to have three pyrochlore phase diffraction peaks at $2\theta$=approximately 14', approximately 28° and approximately 37°.

The catalyst that had been subjected to an endurance test by a catalyst evaluation method using exhaust gas was mounted onto an evaluation engine (2.5 L, NA), and the engine rpm/torque ratio was adjusted so that the temperature at a position 10 mm before the catalyst became 500° C. The A/F ratio of the gas entering the catalyst was adjusted to 14.6, following which the $NO_x$ purification ratio was determined from the gas discharge rate before and after the catalyst per unit time while varying the A/F ratio within a range of $14.2 \leqslant 15.0$ at fixed time intervals.

$NO_x$ purification ratio (%)=[(difference in amount of $NO_x$ entering and leaving catalyst)×1.00/(amount of $NO_x$ entering catalyst)]

The results obtained for the $NO_x$ purification ratio are shown collectively in Table 3 and FIG. 2.

Comparative Example 1

Aside from using a bottom coat-forming slurry (1) for the first-stage catalyst and the second-stage catalyst that was prepared by blending a mixture of Pd-supporting CZ material (A), CZ material (C) and alumina in the weight ratio shown in Table 2 below (100:0:55) together with an alumina binder in a weight ratio of 20:1 and adding water, an exhaust purifying catalyst was obtained in the same way as in Example 1. An endurance test and a performance evaluation were carried out on the resulting exhaust purifying catalyst. These results are shown together with other results in Table 3.

Comparative Example 2

A bottom coat-forming slurry (1) for the first-stage catalyst was prepared by blending a mixture of Pd-supporting CZ material (A), CZ material (C) and alumina in the weight ratio shown in Table 2 below (100:5:50) together with an alumina binder in a weight ratio of 20:1, and adding water. A bottom coat-forming slurry (1) for the second-stage catalyst was prepared by blending a similar mixture in the weight ratio shown in Table 2 below (100:25:30) together with an alumina binder in a weight ratio of 20:1, and adding water. Aside from using these bottom coat-forming slurries (1), an exhaust purifying catalyst was obtained in the same way as in Example 1. An endurance test and a performance evaluation were carried out on the resulting exhaust purifying catalyst. These results are shown together with other results in Table 3 and FIG. 2.

Comparative Example 3

A bottom coat-forming slurry (1) for the first-stage catalyst was prepared by blending a mixture of Pd-supporting CZ material (A), CZ material (C) and alumina in the weight ratio shown in Table 2 below (100:10:45) together with an alumina binder in a weight ratio of 20:1, and adding water. A bottom coat-forming slurry (1) for the second-stage catalyst was prepared by blending a similar mixture in the weight ratio shown in Table 2 below (100:20:35) together with an alumina binder in a weight ratio of 20:1, and adding water. Aside from using these bottom coat-forming slurries (1), exhaust purifying catalyst was obtained in the same way as in Example 1. An endurance test and a performance evaluation were carried out on the resulting exhaust purifying catalyst. These results are shown together with other results in Table 3 and FIG. 2.

Examples 2 to 10

A bottom coat-forming slurry (1) for the first-stage catalyst was prepared by blending a mixture of Pd-supporting CZ material (A), CZ material (C) and alumina in the weight ratio shown in Table 2 below together with an alumina binder in a weight ratio of 20:1, and adding water. A bottom coat-forming slurry (1) for the second-stage catalyst was prepared by blending a similar mixture in the weight ratio shown in Table 2 below together with an alumina binder in a weight ratio of 20:1, and adding water. Aside from using both of these bottom coat-forming slurries (1), exhaust purifying catalysts were obtained in the same way as in Example 1. Endurance tests and performance evaluations were carried out on the resulting exhaust purifying catalysts. The results are shown together with other results in Table 3 and in FIGS. 2 and 3.

TABLE 2

|  | First-stage catalyst | | | | Second-stage catalyst | | | |
| --- | --- | --- | --- | --- | --- | --- | --- | --- |
|  | CZ (A) | CZ (B) | CZ (C) | Alumina | CZ (A) | CZ (B) | CZ (C) | Alumina |
| Comp. Ex. 1 | 100 | 45 | 0 | 55 | 100 | 45 | 0 | 55 |
| Comp. Ex. 2 | 100 | 45 | 5 | 50 | 100 | 45 | 25 | 30 |
| Comp. Ex. 3 | 100 | 45 | 10 | 45 | 100 | 45 | 20 | 35 |
| Example 1 | 100 | 45 | 20 | 35 | 100 | 45 | 10 | 45 |
| Example 2 | 100 | 45 | 25 | 30 | 100 | 45 | 5 | 50 |
| Example 3 | 100 | 45 | 30 | 25 | 100 | 45 | 0 | 55 |
| Example 4 | 100 | 45 | 10 | 45 | 100 | 45 | 0 | 55 |
| Example 5 | 100 | 45 | 15 | 40 | 40 | 45 | 5 | 110 |
| Example 6 | 100 | 45 | 30 | 25 | 60 | 45 | 10 | 85 |
| Example 7 | 60 | 45 | 30 | 65 | 60 | 45 | 10 | 85 |
| Example 8 | 80 | 45 | 65 | 10 | 80 | 45 | 15 | 60 |
| Example 9 | 40 | 45 | 65 | 50 | 40 | 45 | 30 | 85 |
| Example 10 | 100 | 45 | 15 | 40 | 100 | 45 | 15 | 40 |

TABLE 3

| | Proportion of OSC material (N) included in second-stage catalyst (wt %) | Proportion of OSC material (N) relative to total OSC material in converter (wt %) | NO$_x$ purification ratio (%) |
|---|---|---|---|
| Comp. Ex. 1 | 0.0 | 0.0 | 64.0 |
| Comp. Ex. 2 | 83.3 | 9.4 | 65.3 |
| Comp. Ex. 3 | 66.7 | 9.4 | 60.5 |
| Example 1 | 33.3 | 9.4 | 76.8 |
| Example 2 | 16.7 | 9.4 | 85.3 |
| Example 3 | 0.0 | 9.4 | 80.1 |
| Example 4 | 0.0 | 3.3 | 72.0 |
| Example 5 | 25.0 | 8.0 | 82.0 |
| Example 6 | 25.0 | 13.8 | 80.1 |
| Example 7 | 25.0 | 16.0 | 85.3 |
| Example 8 | 18.8 | 24.2 | 76.8 |
| Example 9 | 31.6 | 35.8 | 69.0 |
| Example 10 | 50.0 | 9.4 | 69.0 |

From Table 3 and FIG. 2, in the exhaust purifying catalysts of the examples according to the invention in which the proportion of the amount of OSC material (N) included in the second-stage catalyst with respect to the combined amount of OSC material (N) included in the first-stage catalyst and the second-stage catalyst is in a range of from 0 to 50 wt %, the NO$_x$ purification ratio was at least 69%. Also, from Table 3 and FIGS. 2 and 3, in exhaust purifying catalysts for which the proportion of the amount of OSC material (N) included in the second-stage catalyst with respect to the combined amount of OSC material (N) included in the first-stage catalyst and the second-stage catalyst was in a range of from 0 to 35 wt % and the proportion of the amount of OSC material (N) with respect to the combined amount of OSC material included in the first-stage catalyst and the second-stage catalyst was in a range of from 5 to 30 wt %, the NO$_x$ purification ratio was at least 75%. By contrast, from Table 2 and FIG. 2, in the exhaust purifying catalysts of the comparative examples which did not satisfy the above conditions, the NO$_x$ purification ratio was about 65% or less.

By the invention, exhaust purifying catalyst having a high NO$_x$ purifying capacity can be obtained.

The invention claimed is:

1. An exhaust purifying catalyst comprising:
a substrate;
a first-stage catalyst that includes an oxygen storage capacity material and that is provided on the substrate at an upstream side of the substrate in an exhaust gas flow direction; and
a second-stage catalyst that includes an oxygen storage capacity material and that is provided on the substrate at a downstream side of the substrate in an exhaust gas flow direction,
wherein the oxygen storage capacity material included in the first-stage catalyst and the second-stage catalyst includes oxygen storage capacity material on which a noble metal is not supported,
a proportion of an amount of the oxygen storage capacity material, on which a noble metal is not supported, and that is included in the second-stage catalyst with respect to a combined amount of the oxygen storage capacity material, on which a noble metal is not supported, and that is included in the first-stage catalyst and the second-stage catalyst being in a range of from 0 to 50 wt %,
the first-stage catalyst and the second-stage catalyst are each composed of one or more coat,
at least one of the first-stage catalyst and the second-stage catalyst includes oxygen storage capacity material on which a noble metal is supported,
at least a portion of the oxygen storage capacity material, on which a noble metal is not supported, is present in the same coat as the oxygen storage capacity material on which a noble metal is supported, and
wherein the oxygen storage capacity material, on which a noble metal is not supported, has a pyrochlore phase-type ordered array structure.

2. The exhaust purifying catalyst according to claim 1, wherein the first-stage catalyst and the second-stage catalyst are arranged contiguously.

3. The exhaust purifying catalyst according to claim 1, wherein a proportion of the amount of the oxygen storage capacity material, on which a noble metal is not supported, with respect to the combined amount of the oxygen storage capacity material that is included in the first-stage catalyst and the second-stage catalyst is in a range of from 3 to 36 wt %.

4. The exhaust purifying catalyst according to claim 1, wherein the first-stage catalyst and the second-stage catalyst respectively contain a top coat that includes rhodium as a top-coat noble metal, and a bottom coat that includes platinum or palladium, or platinum and palladium as a bottom-coat noble metal.

5. The exhaust purifying catalyst according to claim 4, wherein all the oxygen storage capacity material, on which a noble metal is not supported, is included in the bottom coat.

6. The exhaust purifying catalyst according to 1, wherein the first-stage catalyst and the second-stage catalyst include the oxygen storage capacity material of at least two types having different oxygen storage/release rates.

7. An exhaust purifying catalyst comprising:
a substrate;
a first-stage catalyst that includes an oxygen storage capacity material and that is provided on the substrate at an upstream side of the substrate in an exhaust gas flow direction; and
a second-stage catalyst that includes an oxygen storage capacity material and that is provided on the substrate at a downstream side of the substrate in an exhaust gas flow direction,
wherein the oxygen storage capacity material included in the first-stage catalyst and the second-stage catalyst includes oxygen storage capacity material on which a noble metal is not supported,
a proportion of an amount of the oxygen storage capacity material, on which a noble metal is not supported, and that is included in the second-stage catalyst with respect to a combined amount of the oxygen storage capacity material, on which a noble metal is not supported, and that is included in the first-stage catalyst and the second-stage catalyst being in a range of from 0 to 50 wt %,
the first-stage catalyst and the second-stage catalyst are each composed of one or more coat,
at least one of the first-stage catalyst and the second-stage catalyst includes oxygen storage capacity material on which a noble metal is supported,
at least a portion of the oxygen storage capacity material, on which a noble metal is not supported, is present in the same coat as the oxygen storage capacity material on which a noble metal is supported, and
wherein the proportion of the amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst is in a range of from 0 to 35 wt %, and a proportion of the amount of the oxygen storage capacity material, on which a noble metal is not supported, with respect to the combined amount of the oxygen storage capacity material included in the first-stage catalyst and the second-stage catalyst is in a range of from 3 to 30 wt %.

8. The exhaust purifying catalyst according to claim 7, wherein the proportion of the amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst is in a range of from 0 to 34 wt %, and the proportion of the amount of the oxygen storage capacity material on which a noble metal is not supported with respect to the combined amount of the oxygen storage capacity material included in the first-stage catalyst and the second-stage catalyst is in a range of from 3 to 25 wt %.

9. An exhaust purifying catalyst comprising:
   a substrate;
   a first-stage catalyst that includes an oxygen storage capacity material and that is provided on the substrate at an upstream side of the substrate in an exhaust gas flow direction; and
   a second-stage catalyst that includes an oxygen storage capacity material and that is provided on the substrate at a downstream side of the substrate in an exhaust gas flow direction,
   wherein the oxygen storage capacity material included in the first-stage catalyst and the second-stage catalyst includes oxygen storage capacity material on which a noble metal is not supported,
   a proportion of an amount of the oxygen storage capacity material, on which a noble metal is not supported, and that is included in the second-stage catalyst with respect to a combined amount of the oxygen storage capacity material, on which a noble metal is not supported, and that is included in the first-stage catalyst and the second-stage catalyst being in a range of from 0 to 50 wt %,
   the first-stage catalyst and the second-stage catalyst are each composed of one or more coat,
   at least one of the first-stage catalyst and the second-stage catalyst includes oxygen storage capacity material on which a noble metal is supported,
   at least a portion of the oxygen storage capacity material, on which a noble metal is not supported, is present in the same coat as the oxygen storage capacity material on which a noble metal is supported, and
   wherein the proportion of the amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst is in a range of from 0 to 35 wt %, and a proportion of the amount of the oxygen storage capacity material, on which a noble metal is not supported, with respect to the combined amount of the oxygen storage capacity material included in the first-stage catalyst and the second-stage catalyst is in a range of from 5 to 30 wt %.

10. The exhaust purifying catalyst according to claim 9, wherein the proportion of the amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst is in a range of from 0 to 34 wt %, and the proportion of the amount of the oxygen storage capacity material, on which a noble metal is not supported, with respect to the combined amount of the oxygen storage capacity material included in the first-stage catalyst and the second-stage catalyst is in a range of from 8 to 25 wt %.

11. An exhaust purifying catalyst comprising:
    a substrate;
    a first-stage catalyst that includes an oxygen storage capacity material and that is provided on the substrate at an upstream side of the substrate in an exhaust gas flow direction; and
    a second-stage catalyst that includes an oxygen storage capacity material and that is provided on the substrate at a downstream side of the substrate in an exhaust gas flow direction,
    wherein the oxygen storage capacity material included in the first-stage catalyst and the second-stage catalyst includes oxygen storage capacity material on which a noble metal is not supported,
    a proportion of an amount of the oxygen storage capacity material, on which a noble metal is not supported, and that is included in the second-stage catalyst with respect to a combined amount of the oxygen storage capacity material, on which a noble metal is not supported, and that is included in the first-stage catalyst and the second-stage catalyst being in a range of from 0 to 50 wt %,
    the first-stage catalyst and the second-stage catalyst are each composed of one or more coat,
    at least one of the first-stage catalyst and the second-stage catalyst includes oxygen storage capacity material on which a noble metal is supported,
    at least a portion of the oxygen storage capacity material, on which a noble metal is not supported, is present in the same coat as the oxygen storage capacity material on which a noble metal is supported, and
    wherein the proportion of the amount of the oxygen storage capacity material, on which a noble metal is not supported, and that is included in the second-stage catalyst with respect to the combined amount of the oxygen storage capacity material, on which a noble metal is not supported, and that is included in the first-stage catalyst and the second-stage catalyst is in a range of from 0 to 25 wt %, and a proportion of the amount of the oxygen storage capacity material on which a noble metal is not supported with respect to the combined amount of the oxygen storage capacity material included in the first-stage catalyst and the second-stage catalyst is in a range of from 8 to 16 wt %.

12. An exhaust purifying catalyst comprising:
    a substrate;
    a first-stage catalyst that includes an oxygen storage capacity material and that is provided on the substrate at an upstream side of the substrate in an exhaust gas flow direction; and
    a second-stage catalyst that includes an oxygen storage capacity material and that is provided on the substrate at a downstream side of the substrate in an exhaust gas flow direction,
    wherein the oxygen storage capacity material included in the first-stage catalyst and the second-stage catalyst includes oxygen storage capacity material on which a noble metal is not supported,
    a proportion of an amount of the oxygen storage capacity material, on which a noble metal is not supported, and that is included in the second-stage catalyst with respect to a combined amount of the oxygen storage capacity material, on which a noble metal is not supported, and that is included in the first-stage catalyst and the second-stage catalyst being in a range of from 0 to 50 wt %, the first-stage catalyst and the second-stage catalyst are each composed of one or more coat, at least one of the first-stage catalyst and the second-stage catalyst includes oxygen storage capacity material on which a noble metal is supported, at least a portion of the oxygen storage capacity material, on which a noble metal is not supported, is present in the same coat as the oxygen storage capacity material on which a noble metal is supported, and wherein the first-stage catalyst and the second-stage catalyst include the oxygen storage capacity material of at least two types having different oxygen storage/release rates such that the oxygen storage/release rate by the first-stage catalyst is lower than the oxygen storage/release rate by the second-stage catalyst.

13. The exhaust purifying catalyst according to claim 4, wherein the bottom coat further includes alumina.

* * * * *